United States Patent [19]
Von Ohain et al.

[11] 3,770,227
[45] Nov. 6, 1973

[54] JET WING WITH MULTIPLE THRUST AUGMENTORS

[75] Inventors: Hans J. P. Von Ohain; Charles A. Scolatti, both of Dayton, Ohio

[73] Assignee: The United States of America as represented by the Secretary of the Air Force, Washington, D.C.

[22] Filed: Sept. 10, 1971

[21] Appl. No.: 179,532

[52] U.S. Cl. .......................... 244/42 CC, 244/12 B
[51] Int. Cl. ........................ B64c 3/00, B64c 21/04
[58] Field of Search ...................... 244/42 C, 42 CC, 244/42 CF, 42 CE, 42 D, 42 DB, 42 DC, 12 R, 12 B, 12 D, 15, 35 R, 40 R, 40 A, 41, 45 R, 73 R

[56] References Cited
UNITED STATES PATENTS

| | | | |
|---|---|---|---|
| 2,464,663 | 3/1949 | Zingg .............................. | 244/12 R |
| 3,033,493 | 5/1962 | Wilde et al. ...................... | 244/23 B |
| 3,174,707 | 3/1965 | Ricard ............................ | 244/12 D |
| 3,545,701 | 12/1970 | Bertin et al. ..................... | 244/12 B |

*Primary Examiner*—Milton Buchler
*Assistant Examiner*—Jesus D. Sotelo
*Attorney*—Harry A. Herbert, Jr. et al.

[57] ABSTRACT

The invention relates to an aircraft with VTOL or STOL operational capability. In accordance with the invention, the wing, or airfoil contour, is provided with a plurality of spanwise extending slots or ducts having inlet and outlet openings in the suction and pressure surfaces respectively of the wing. The slot openings are normally closed by spanwise extending flaps which fair into the airfoil contour and when the slots are open cooperate therewith to form individual thrust augmenting ducts. A large number of primary nozzles are provided for injecting high pressure air, derived for example from the bypass air of a conventional turbofan engine, into the ducts. The injected air is delivered as individual jets moving downward in the direction from the suction to the pressure surface of the airfoil and inducing a flow of ambient air from above the wing to mix with the primary air from the jets. The increased mass flow from the thrust augmentor ducts will give rise to vertical thrust or lift which may be of the order to twice the thrust which would have been produced by the primary air alone. The flaps on at least the suction surface are individually operable both as to magnitude and rate of displacement so as to provide for varying conditions of flight operation.

1 Claim, 16 Drawing Figures

INVENTORS
HANS J. P. VON OHAIN
CHARLES A. SCOLATTI
BY Harry G. Herbert Jr.
Raymond J. Crowley
ATTORNEYS

JET WING WITH MULTIPLE THRUST AUGMENTORS

BACKGROUND OF THE INVENTION

1. Field of the Invention

The invention relates to a means for developing lift on an aircraft having what is known as an augmentor wing.

2. Description of the Prior Art

U. S. Pat. No. 2,464,663 to Theodore Zingg. This patent discloses an aircraft in which an engine driven compressor delivers air to hollow spar members which communicate with nozzles adapted to inject jets of primary air into slots formed between spars and opening into the suction and pressure surfaces of the wing. The primary jets induce a secondary flow from above the wing into the slots, which mixed flow is discharged downward to produce a lift reaction. The slot outlets are contained by adjustable flaps which can be used to obtain a horizontal or thrust component from the discharge from the slots. Zingg has no flaps or other means on the suction surface of the wing whereby inlet flow to the slots can be guided and the inlets to the slots cannot be closed in horizontal flight.

U. S. Pat. No. 3,045,947 to J. H. Bertin et al. This patent discloses in FIG. 1 a wing having a pair of spanwise extending flaps which when deflected form an ejector duct into which a sheet-like jet of air is injected to mix with induced secondary air. The mixed flow discharged from the duct produces a lift reaction. In FIG. 2 the ejector duct extends spanwise through the wing and the diffuser portion thereof is formed by retractable flaps on the pressure surface of the wing. The flaps when lowered form a spanwise extension of the wing duct. Injector nozzles discharge sheet-like jets of air downward which induce a secondary flow of air into the duct. The increased mass flow through the duct produces a greater lift reaction than that which would be produced by the jet discharge alone. This patent has no spanwise extending flaps or other means for guiding the inflow in the various flight conditions.

Bertin Project Aladin. In the magazine "Vertical World", Vol. II, No. 7, July 1967, page 12, there is disclosed a model of a proposed aircraft in which the wing appears to be constructed in the form of Venetian blind slats. It is known, however, that the aircraft was to have sections on the pressure and suction surfaces connected for rotation as a pair each about one of a plurality of hollow spanwise extending spar members. When a plurality of such sections are rotated, a plurality of ejector ducts are formed into which nozzles inject jets of air to produce an augmented lift reaction. The nozzles are fed with compressed air delivered via the hollow wing spars. In this proposed aircraft there is no way to guide the inflow to the ducts in flight conditions, such as vertical takeoff.

U. S. Pat. No. 3,332,644 to D. C. Whittley. This patent disclosed an augmentor wing which is an improved version of the device of U. S. Pat. No. 3,045,947 to Bertin et al, FIG. 1 described above.

BRIEF SUMMARY OF THE INVENTION

The invention is characterized by the provision in an aircraft having a V/STOL capability of a wing having a plurality of spanwise extending ducts having inlets and outlets respectively formed in the suction and pressure surfaces of the wing. The duct inlets and outlets are normally closed by overlying flaps formed to fair into the airfoil section of the wing and when the flaps are moved to open the ducts, the flaps form convergent and divergent extensions of the inlets and outlets of the ducts. Compressed bypass air from one or more turbofan engines is injected into the respective ducts by means of a large number of injection nozzles. The injected air induces the flow of ambient air above the wing into the duct inlets to mix with the jets and the combined flow to be diffused downward to produce an augmented vertical thrust or lift. The flaps on the suction surface of the wing are adapted to be individually angularly adjusted in the vertical takeoff condition into a fan-like array to conform with the inlet potential source flow steamlines and to be shifted to each being in substantial alignment with a respective flap on the suction surface during the transition from vertical to the horizontal flight conditions.

BRIEF DESCRIPTION OF THE DRAWINGS

FIG. 3 is a view partly in ssection illustrating the power plant of the aircraft of FIG. 1;

FIG. 6 is a side elevation sectional view taken on line 6—6 of FIG. 1 illustrating the wing thrust augmentor structure arrangement for the vertical take off and landing condition;

DETAILED DESCRIPTION OF THE INVENTION

Figure 1:
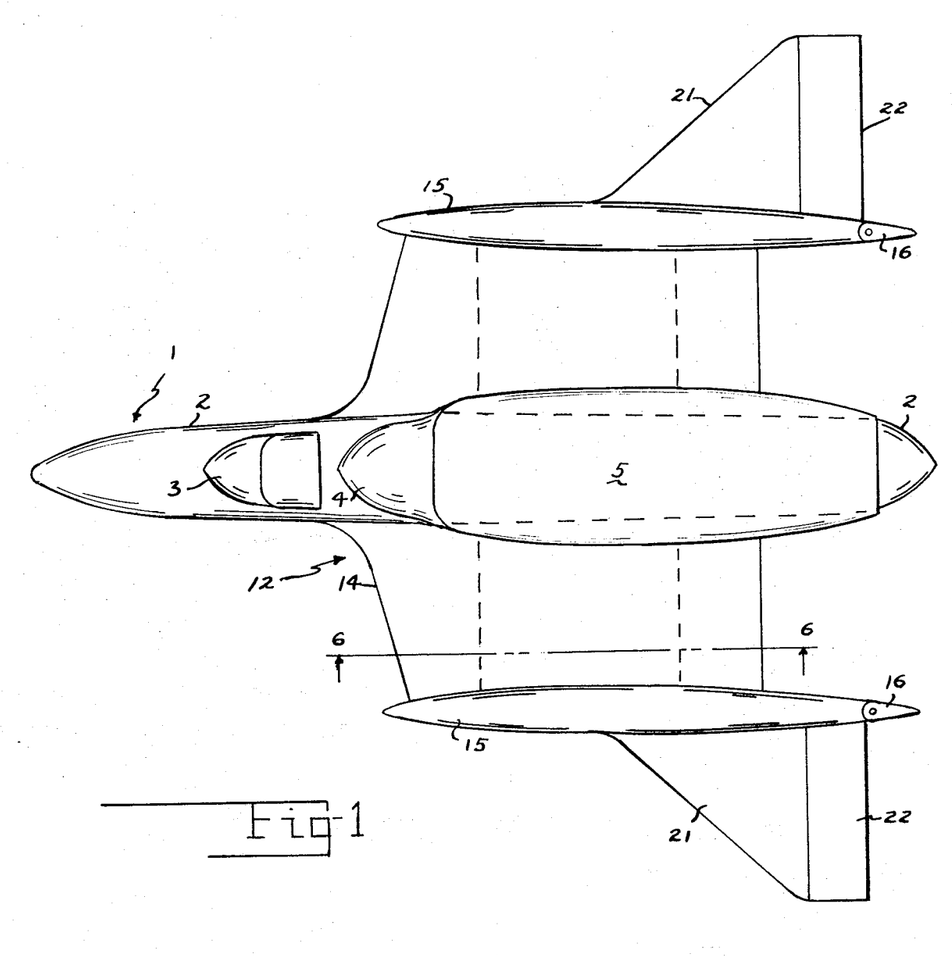
FIG. 1 illustrates a top plan view of an aircraft incorporating features of the invention.
Figure 2:
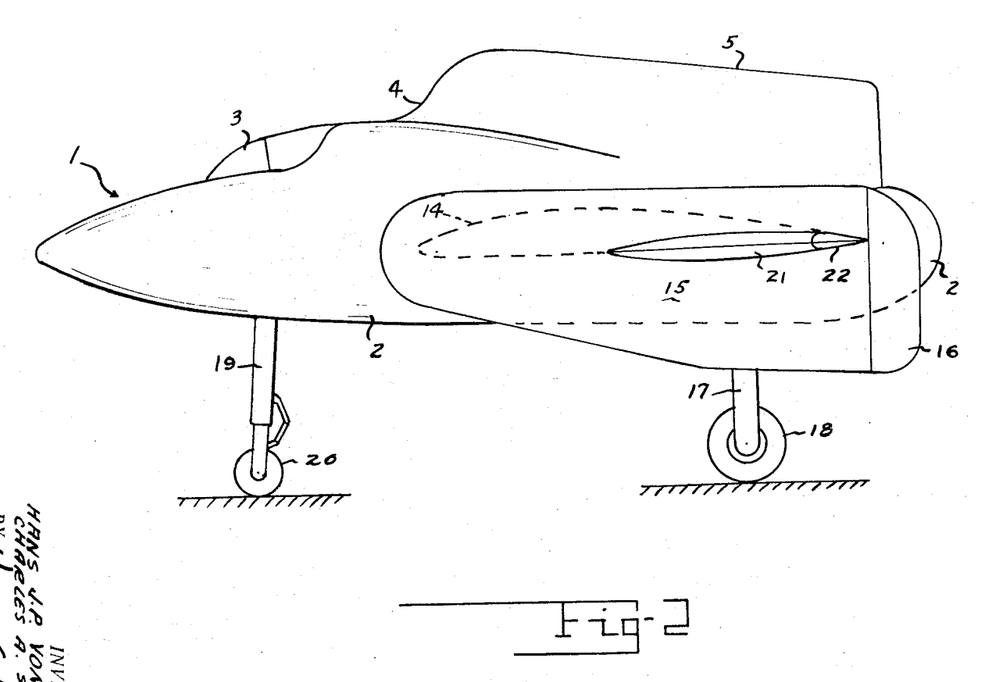
FIG. 2 is a side elevation of the aircraft of FIG. 1.

With reference to FIGS. 1 and 2 of the drawings, the reference numeral 1 generally indicates an aircraft having a conventional fuselage 2 with cockpit enclosure 3 and to the rear thereof an inlet opening 4 to a housing portion 5 inclosing a conventional turbofan power plant.

The aircraft, as seen in FIG. 1, is provided with a monoplane wing of low aspect ratio and generally indicated by the reference numeral 12. The wing 12 is symmetrical about the longitudinal axis of the fuselage 2. The wing 12 includes inboard panels generally indicated by the reference numeral 14, each bounded at its tip portions by vertical end plates 15 which are streamlined in shape in plan view. The end plates 15 of considerable thickness in the spanwise direction also serve as housings which tie together the spar structure, inclose the flap operating gear later to be described and supporting and housing main landing gear struts 17 and main landing wheels 18, note FIG. 2. As also seen in FIG. 2, the aircraft fuselage is provided with a retractable shock strut 19 which carries the nose wheel 20.

As seen in FIG. 1, the wing assembly 12 also includes outboard wing panels 21 extending spanwise from the respective end plates 15 and each carrying a conventional aileron 22. In addition to the conventional flight control surfaces the aircraft is provided with known jet reaction type of controls (not shown) for the vertical take off and landing conditions, such as for example provided in the Hawker "Harrier" P–1127 and the Lockheed "Hummingbird."

Figure 4:
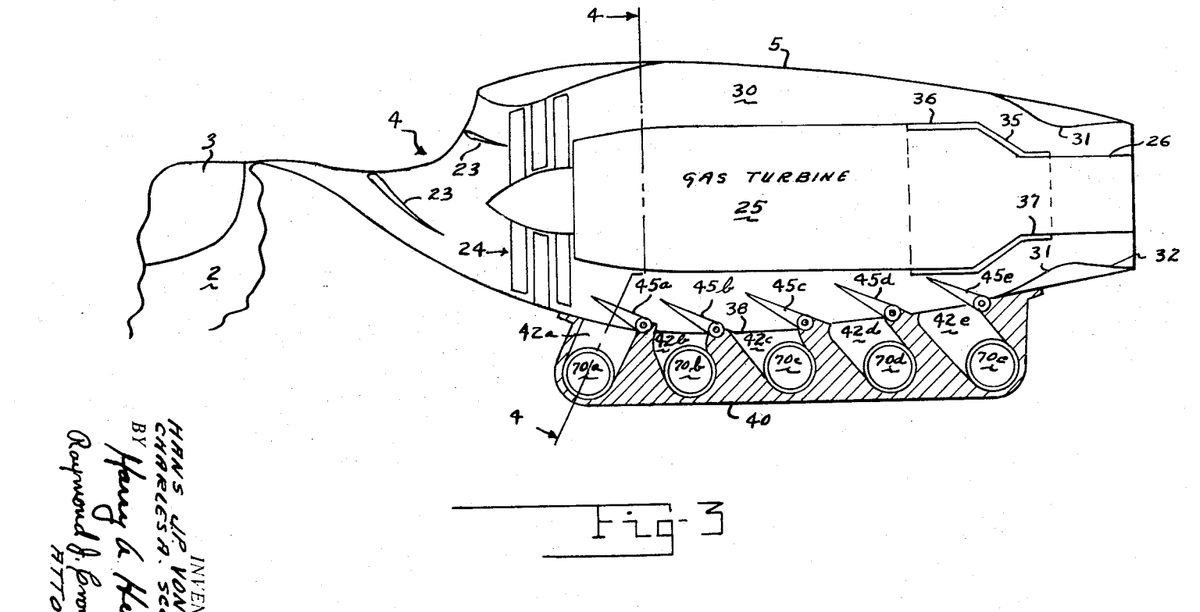
FIG. 4 is a sectional view taken on line 4—4 of FIG. 3 and illustrating the means for distribution of bypass air to the hollow wing spars.

As seen in FIG. 3, the inlet 4 in the fuselage 2 is provided with curved guide vanes 23 which direct the inlet air into the forward end of the housing 5 and into a two stage fan generall indicated at 24. The fan assembly 24 includes two sets of fan blades with a set of stator blades therebetween. The fan assembly 24 forms part of a conventional turbofan type of engine generally indicated at 25 which discharges heated gases through a tail pipe 26. The fan assembly 24 driven by the gas turbine unit supplies inlet air to the gas turbine and also delivers a major portion of its output air to a bypass duct 30 which is annular in cross section and formed by the space between the housing 5 and the gas turbine unit 25. The bypass duct 30 is provided with an annular restriction 31 adjacent its downstream end and terminates in an outlet nozzle 32 which discharges the bypass air concentric with the hot jet discharge from the tail pipe 26. A hollow conical valve member 35 having cylindrical guiding portions 36 and 37 is positioned within the duct 30. The guide portion 36 encircles and is axially slidable on the aft end of the casing of the gas turbine 25 and the guide 37 is slidable on the tail pipe 26. The valve member 35 is axially shiftable by power means later to be described, and when moved downstream from the position shown in FIG. 3 engages the constriction 31 which serves as a valve seat and cuts off discharge of bypass air from the discharge nozzle 32. When the valve 35 is in the open position as shown in FIG. 3, the bypass air discharged from the nozzle 32 produces propulsive thrust in addition to the thrust produced by the jet discharged from the tail pipe 26. When the valve 35 is moved to the downstream position, as above described, pressure builds up in the duct 30 and can pass through an aperture 38 cut in the bottom of the casing 5 and covered by a housing 40 suitably secured around its marginal edges to the casing 5, note also FIG. 4. As seen in FIG. 3, the housing 40 is subdivided into a plurality of spaced pockets or chambers, five in number, and respectively indicated as 42a, 42b, 42c, 42d and 42e. The pockets are open on their upper sides for respective communication with the bypass duct 30 but such communication being controlled by vane-like valve members 42a through 45e, respectively. The respective valve members 45a through 45e are each pivotally supported along their lower lateral edges by a pivot shaft 46 which is journaled in suitable bearings in the side walls of the casing 40, note FIG. 4.

As seen in FIG. 3, the pockets or chambers 42a through 42e inclusive of housing 40 have semicircular bottom portions adapted to embrace hollow metal wing spars 70a through 70e inclusive, which additionally function to serve as conduits for the distribution of compressed air in a manner later to be described. The hollow spars 70a through 70e inclusive are continuous through the housing 40 and may be suitably anchored therein by means of bolts or the like, not shown. The spars have a central cut out portion 71, as noted in FIG. 4, which will allow free flow communication between the bypass duct 30 and the interior of the spars 70a through 70e when the vane-like valve members 45a through 45e inclusive are elevated into the position as shown in FIG. 3. The vane-like valve members 45a through 45e inclusive each overlies the marginal edges of a respective one of the chambers 42a through 42e inclusive and when in contact therewith serves to cut off air flow communication between bypass duct 30 and the respective pockets 42a through 42e.

Figure 5:
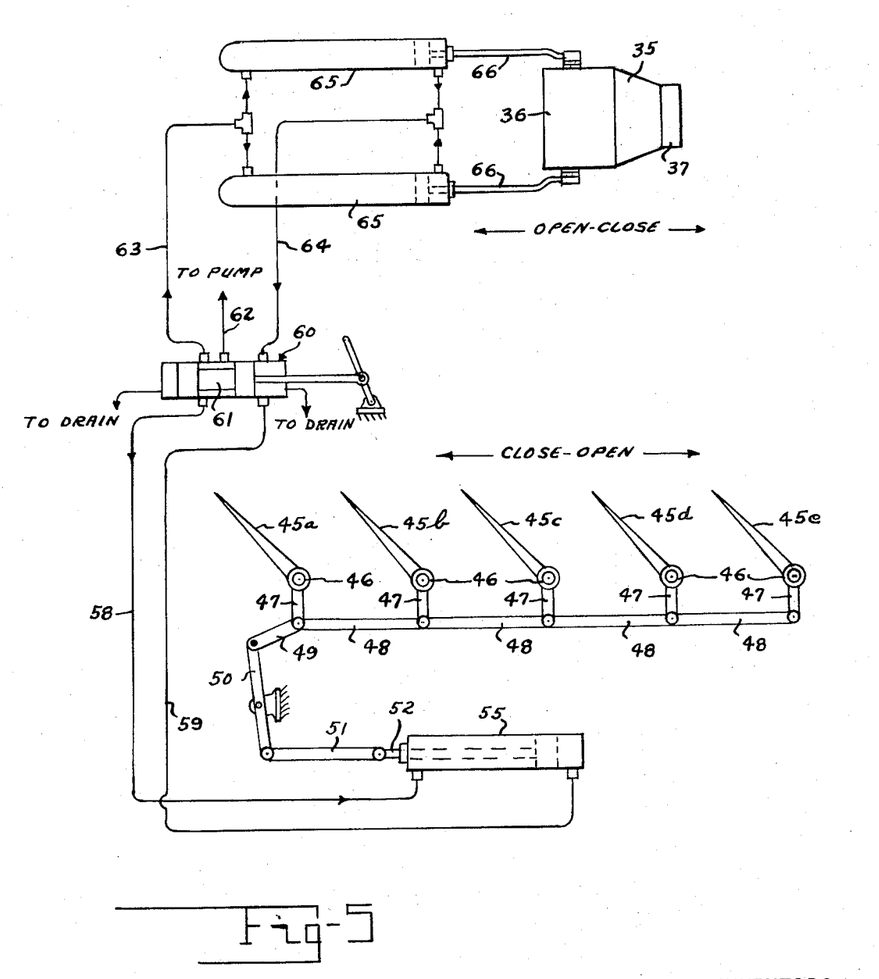
FIG. 5 is a schematic view illustrating the control means for diverting bypass air from the bypass duct to the hollow wind spar structure.

The means for controlling the vane-like valve members 45a through 45e in concert with the valve member 35 is illustrated in FIG. 5. Referring to this figure, it will be noted that each of the shafts 46 associated with the valve members 45a through 45e has secured thereto an arm 47. All of the arms 47 are connected in series by means of links 48 and which through links 49, 50 and 51 are connected to the piston rod 52 of a double acting hydraulic servomotor cylinder 55. Hydraulic motive fluid can be selectively supplied to the motor cylinder 55 by conduits 58 and 59 under control of a conventional spool type control valve 60. The valve spool 61 in one position allows free flow of pressure fluid from a conduit such as 62 connected to a pressure source such as a pump, not shown, to flow to the conduit 58 and to servomotor cylinder 55 fluid returned from the cylinder through conduit 59 flows through valve 60 to drain. Similarly, the valve spool may be shifted to the right from the position shown in FIG. 5 to direct flow of pressure fluid from conduit 62 through valve 60 to conduit 59 and to connect conduit 58 to drain. The vane-like valve members 45a through 45e will be simultaneously raised to the position shown in FIGS. 3 and 5 by shifting the spool 61 of valve 60 in one direction and will be simultaneously lowered to the closed dotted line position (FIG. 5) by actuation of the valve spool 61 of control valve 60 in the opposite direction. As further seen in FIG. 5, conduits 63 and 64 are connected to the control valve 60 in parallel with the conduits 58 and 59 and serve to supply hydraulic pressure fluid from source line 62 to a pair of parallel connected double acting hydraulic servomotor cylinders 65. The piston rods 66 of the cylinders 65 are each connected to the guide portion 36 of the tapered conical valve member 35 previously described with respect to FIG. 3. The valve member 35 is shifted to the right as seen in FIG. 5 when the control valve 60 is operated to cause vane-like valve members 45a through 45e to be elevated. Continued movement of valve 35 causes the same to contact the restriction 31 in the bypass duct 30

(FIG. 3) and close off discharge of bypass air from the duct discharge nozzle 32 (FIG. 3). Compressed air is free to flow to chambers 42a through 42e past the open valve members 45a through 45e respectively. Similarly, when vane-like valve members 45a through 45e respectively are simultaneously moved to the closed position, dotted line FIG. 5, valve 35 will be shifted to the left to the open position allowing free flow of bypass air from duct 30 past the construction 31 and out the discharge nozzle 32, FIG. 3. The valve member 60 when actuated either allows bypass air from the engine bypass duct 30 to freely pass to the atmosphere through constriction 31 and discharge nozzle 32 or to pass through the vane-like valve members 45a through 45e and to the chambers 42a through 42e (FIG. 3) and thence to the interior of the hollow spar members 70a through 70e respectively which respectively serve as conduits to distribute the engine bypass air to the wing structure thrust augmentor ducts.

While the means for delivering compressed bypass air to the hollow spar members has been illustrated and described for simplicity as involving only a single engine, it will be understood that in practice a plurality of turbofan bypass engines will be employed to insure maximum safety. In practice two or more engines will be employed each capable of delivering its compressed bypass air to the hollow spar system in parallel with the other engine or engines. The engines can be connected by a known manifolding system so as to deliver the compressed air to the hollow spar system with suitable delivery valving so that in the event of failure of any engine its delivery valve can be closed to prevent bypassing of compressed air through the disabled engine. Since such systems are broadly known, illustration thereof is not required.

Figures 6A, 7:
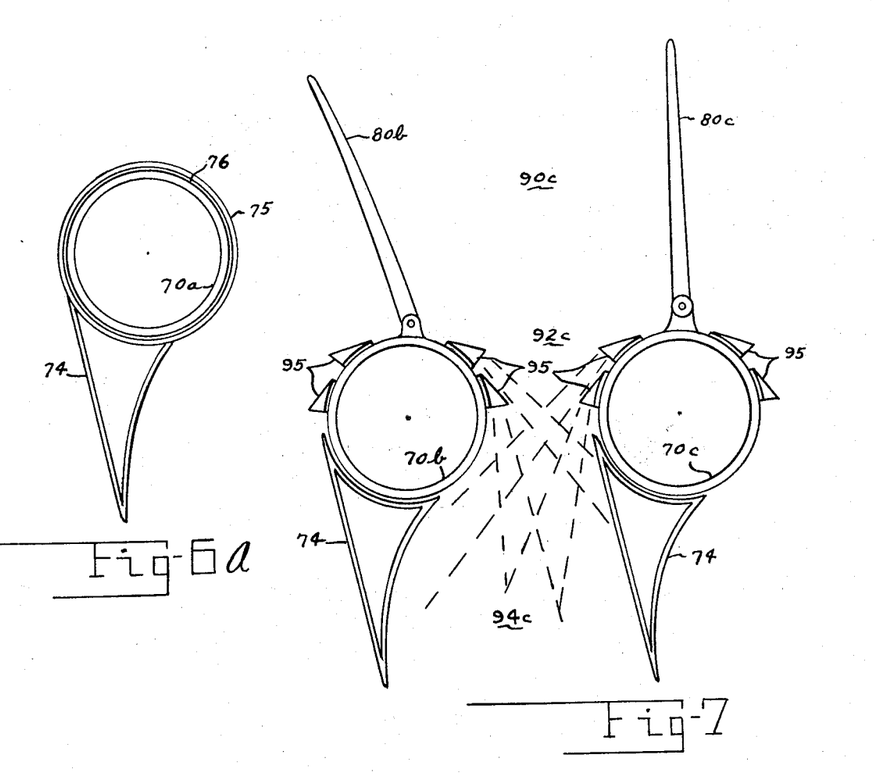
FIG. 6A is a view illustrating the mounting of a typical pressure surface flap for pivotal rotation about a hollow wing spar.
FIG. 7 illustrates the action of the primary air injection nozzles.

The thrust augmenting structure will now be described. With reference to FIG. 6, this figure is a typical section of the inboard panel 14 of the aircraft wing 12 of FIG. 1 taken on line 6—6 of FIG. 1, with the wing elements in position for vertical take off or landing. As seen in this figure, the wing panel 14 has the hollow wing spars 70a through 70e respectively spaced in a chordwise relation. The spars 70a through 70e are anchored at their inner ends in the housing 40 as previously described with respect to FIG. 4 and may be additionally secured by any suitable means (not shown) to the fuselage structure. At their outer ends the spars are secured in spaced relation to the respective end plate structure 15 with the open ends of the spars closed in a suitable manner, not shown. The hollow spar 70a forms an integral part of the hollow nose section 72. Each of spars 70a through 70d inclusive has associated therewith a flap member 74 which normally lies within the pressure surface of the airfoil cross section of the wing but in FIG. 6 shown fully deflected downward. The flap members 74 are secured at each end to a narrow ring 75 which encircles the associated hollow spar member and the ring 75 has bonded thereto a ring 76 of polyfluorethylene plastic such as "Teflon" to serve as a bearing on the spar member as seen in FIG. 6a. Additional narrow pivotal bearings may be provided if desired. The respective flap members 74 are actuated by structure later to be described. As seen in FIG. 6 the last of the chordwise spaced hollow spar members 70e has pivotally mounted thereon a trailing edge flap 78 which may be pivotally mounted to rotate on spar 70e in the same manner as flaps 74 are mounted for rotary movement. The hollow spar members 70b through 70e have respectively pivoted thereon flaps 80b through 80e which normally lie in the envelope of the suction surface of the airfoil section of the inboard wing panel 14. The hinge pin is indicated at 82 and the hinge support on the spar at 84. The hinge joint preferably is of the piano hinge type. The flaps 80b through 80e when moved to the closed position are preferably latched by a remote controlled positive locking means, not shown, preferably of the type employed in landing gear and bomb bay doors.

It will be noted in FIG. 6 and also applicable to FIG. 7 that the suction surface flap 80b cooperates with the suction surface of the nose section 72 to form a convergent inlet 90b which extends spanwise the full span of the inboard panel 14 of wing 12. Similarly flaps 80b and 80c cooperate to form convergent inlet 90c and pairs of flaps 80c – 80d, 80d – 80e form convergent inlets 90d and 90e respectively. Similarly, the chordwise space between adjacent pairs of spars form passage throats of nearly constant cross sectional area and extending spanwise the full length of each inboard wing panel 14. The passage throats are indicated as 92b, 92c, 92d and 92e respectively. The spanwise extending space between pairs of adjacent flaps 74 and between the last flap 74 and trailing edge flap 78 form divergent diffuser passages indicated respectively by reference characters 94b through 94e. The inlet, throat and diffuser passages collectively form respective thrust augmentor ducts.

Figure 8:
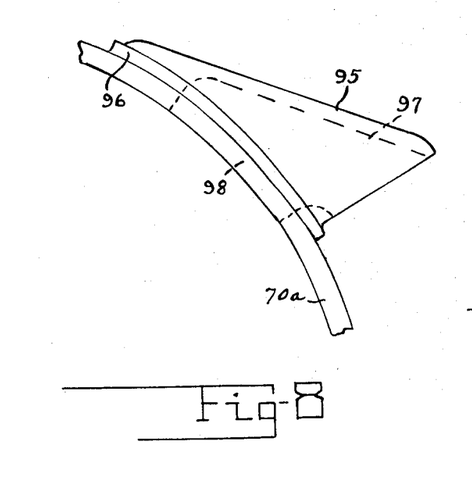
FIG. 8 is a side elevation of a typical injection nozzle as mounted on a wing spar.
Figure 9:
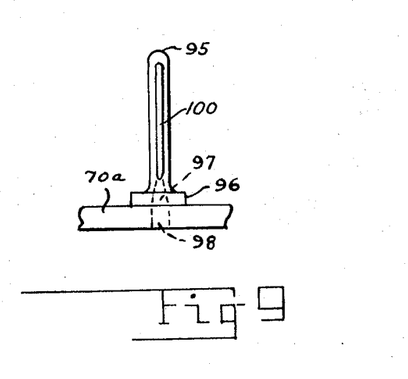
FIG. 9 is a front view of the nozzle of FIG. 8 illustrating the nozzle orifice.

Under the flight conditions of vertical take off and transition to horizontal flight, substantially all of the bypass air developed by the fan stages 24 of turbofan engine 25, FIG. 3, will be delivered in parallel flow to the respective hollow wing spars 70a through 70e. This compressed air will be injected into the inlet passage 90b, etc. of each thrust augmentor duct by means of primary air injection nozzles 95 which are positioned in two rows on each side of the throat wall and which inject jets of high velocity air into the augmentor duct as indicated by the dotted line spray pattern in FIG. 7. As seen in FIGS. 8 and 9, each nozzle 95, which preferably is made of high strength injection molded plastic material, is provided with a thin base 96 which can be cemented to the outer wall of the hollow wing spar such as 70a. Each nozzle 95 is molded with an internal cavity 97 which is adapted to open and be in register with a slot 98 cut through the wall of the wing spar, such as illustrated at 70a. The internal cavity 97 opens on the front surface of the nozzle assembly as the narrow orifice 100 which may be of the order of five thirty-seconds of an inch in width and of the order of three inches in length. There are, for example, 16 rows of nozzles laterally spaced two inches on centers in each row for a total of 640 nozzles in each inboard wing panel 14, FIG. 1. A large number of nozzles is essential to obtain the optimum mixing effect and high thrust augmentation ratios. Air under pressure within the hollow wing spars can emerge from each nozzle as a thin jet of high velocity air. Such thin jets tend to oscillate laterally thus insuring good mixing with secondary air drawn into the inlet 90c, FIG. 7, because the reduction in pressure in the fan-shaped jets causes air under ambient pressure to move into the inlets to mix with the primary jets. The induced secondary flow acquires kinetic energy from the primary flow and the increased mass flow enters the diffuser section such as 94c in FIG. 7 where it expands and reduces its velocity and increases its static pressure. Because of the inlet flow velocity, the ambient pressure above the wing is reduced so that a reduced pressure exists above the wing and an increased static pressure exists below the wing surface producing an upward thrust or lift reaction. Wind tunnel tests at the NASA facility, Langley Field, Virginia indicate that the vertical lift or thrust may approach or equal as much as twice the reaction force which could be produced by directing the bypass air from the engine bypass duct 30 directly downward.

Figure 10:
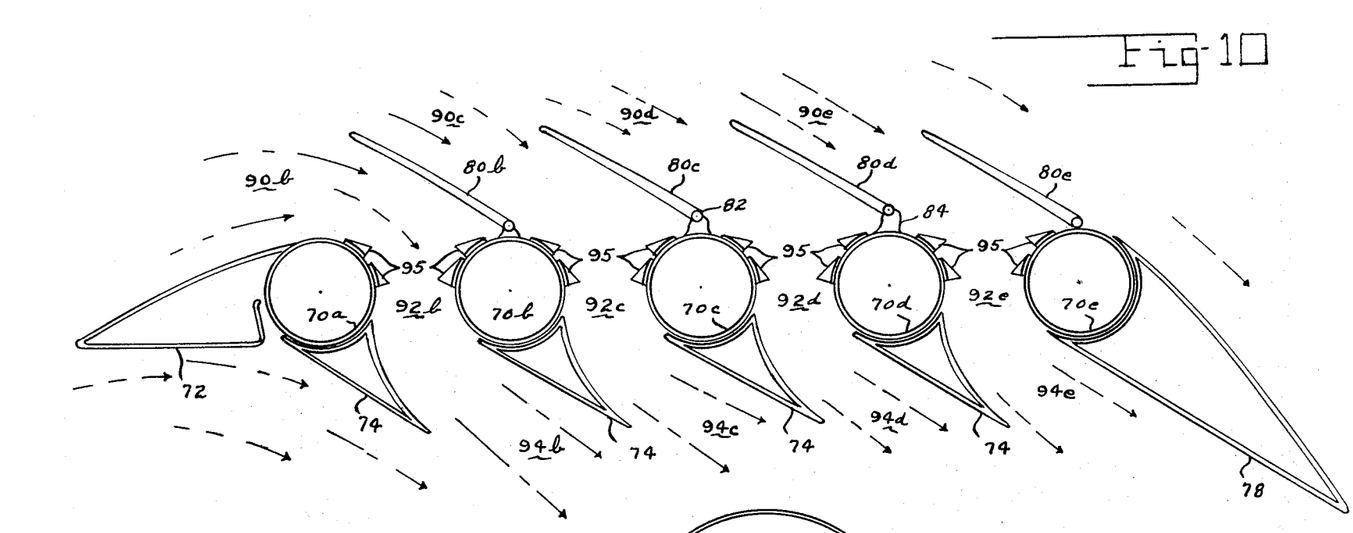
FIG. 10 is a view similar to FIG. 6 but illustrating the wing thrust augmentor structure parts arrangement for the transition stage or short take off and landing condition.

In the position of the parts as illustrated in FIG. 6, the streamlines of the potential flow in the inlets 90b through 90e have a fan-shaped distribution such that the angular setting of each of the flaps 80b through 80e differ from each other and the rate of change of movement from the condition, FIG. 6, to such as FIG. 10 will also differ. In general the magnitude and rate of movement of the pressure surface flaps 74 and trailing edge flap 78 are equal for each flap.

The relation of the parts as illustrated in FIG. 10 corresponds to the transition condition or short take off and landing condition. In this case, the primary nozzles 95 are again functioning as described with respect to FIGS. 7, 8 and 9 injecting streams of compressed air into the inlets 90b through 90e respectively. The angular setting of the flaps 80b through 80e on the suction surface of the wing are substantially the same with respect to the chord line and parallel with the setting of the pressure surface flaps 74 and 78. The mass flow discharge from the duct diffuser sections 94b through 94e are inclined with respect to the chord line so as to produce a horizontal or propulsive thrust component in the reaction force. Ordinarily it would be thought that as the thrust augmentor duct axes are tilted toward the horizontal that the lift component would be reduced and it would be necessary to dive the airplane to produce the necessary lift. Wind tunnel tests have shown however that no diving maneuver is necessary. The reason is that the relation of parts as illustrated in FIG. 10 corresponds somewhat to a multiple slotted wing and the total circulation about the wing is increased which combined with the horizontal aircraft velocity gives an increased lift. The forced or supercirculation more than offsets the loss in lift due to development of a horizontal thrust or propulsion component.

Figures 10, 11:
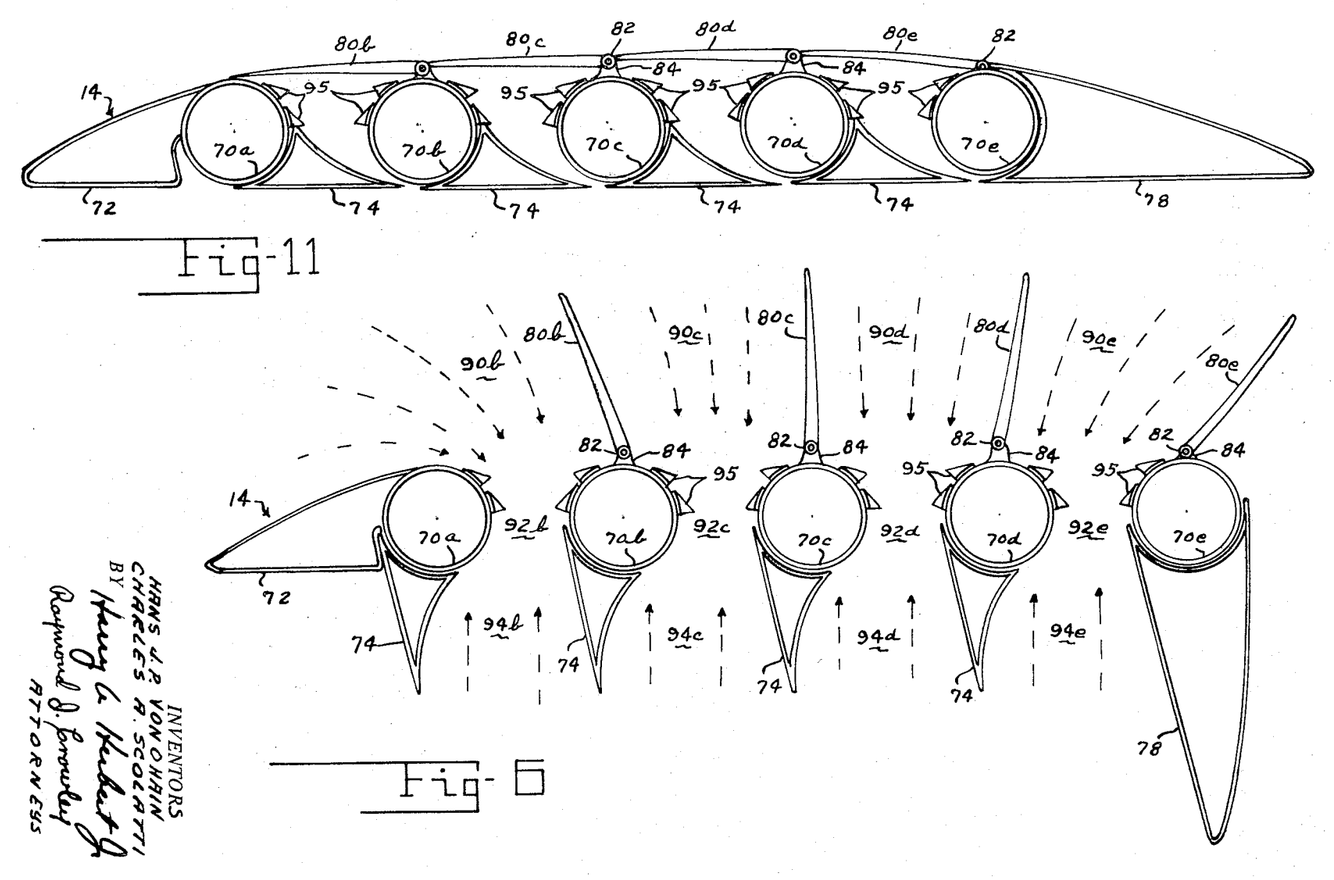
FIG. 11 is a further view similar to FIG. 6 but illustrating the position of the wing thrust augmentor structure parts for the cruising and high speed flight condition.

In moving the components of the thrust augmenting wing structure from the position as shown in FIG. 10 to the cruising flight condition relation as shown in FIG. 11 it will be understood that the horizontal or propulsive thrust component will increase as the flaps on the pressure and suction surfaces are brought towards the closed position. The increasee in the horizontal thrust component of the duct discharge will increase causing aircraft forward velocity to increase. The lift due to forward velocity acting on the wing will become predominant and the pilot through a suitable control can cause the amount of bypass air diverted through the vane type valves 45 a etc. to decrease and the propulsive discharge through the nozzle 32, FIG. 3 to increase. When the valve 35, FIG. 3, is moved to the left to completely free the obstruction to flow, the aircraft will be propelled solely by the combined thrust of the discharge of hot gas from the tail pipe 26 and bypass air from nozzle 32. The lift will then be totally supplied by the wing acting as a conventional airfoil and all of the flaps thereon will be in the closed or neutral position and there will be no flow of primary air from the injector nozzles 95 or induction of secondary air into the augmentor duct inlets 90b through 90e respectively. It will be understood that suitable resilient sealing surfaces will be provided for the respective suction and pressure surface flaps to engage in the position of the parts as shown in FIG. 11 in order to avoid leakage and disruption of normal flow over the aerodynamic surface of the wing.

The means for power actuating the pressure surface flaps 74 and 78 and suction surface flaps 80b through 80e inclusive will now be described with reference to FIGS. 12 and 13.

Figure 12:
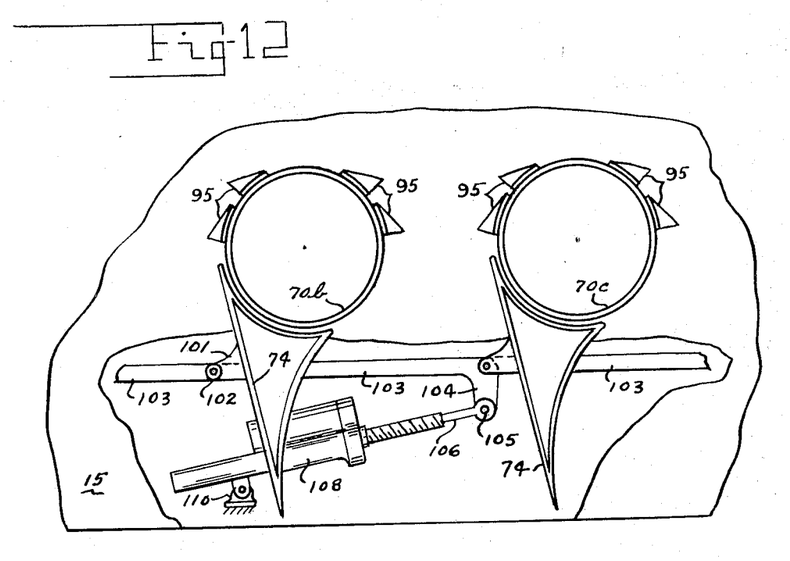
FIG. 12 is a view partly in section illustrating the actuating means for the pressure surface and trailing edge flaps.

With reference to FIG. 12, this figure illustrates the means for actuation of the pressure surface flaps 74, FIG. 6, 7, 10 and 11. As previously noted with reference to FIG. 6 that the hollow spar members 70a through 70e respectively were secured at their outer ends to end plate members 15, FIG. 1, which in addition to housing the main landing gear also housed the flap operating mechanisms. In FIG. 12 the end plate housing structure 15 is broken away to illustrate the mechanism for operating the flaps 74 located within the housing. At their outer ends each of the flaps 74, two only shown, on the pressure surface of the wing have secured thereto an arm 101 to which is affixed a pin 102 projecting inward through an arcuate slot, not shown, in the wall of the end plate housing 15. To each of the pins 102 there are connected one or more serially arranged links 103 which insure that all flaps will move in synchronism. One of the links 103 is provided with a depending arm 104 which is pivotally connected at 105 to the terminal end of a jack screw 106 forming part of a conventional electric screw jack type of actuator 108, pivotally supported for swivelling movement in the vertical plane at 110. In this type of actuator, a reversible high speed direct current motor rotatably drives an internally threaded nut through suitable reduction gearing. The nut while free to rotate is held by suitable bearings against axial movement. The nut is threaded onto a jack screw which is capable of axial movement but prevented from rotation. Power rotation of the nut will accordingly cause axial movement of the jack screw in one direction or the other depending on the direction of rotation of the electric motor. Due to mechanical advantage if is possible to procure such devices having a weight of less than ten pounds capable of exerting thrust of several thousands of pounds. When the electric motor is de-energized the jack screw becomes locked in its then adjusted position because no amount of external force acting on the jack screw terminal can cause rotation of the feed nut associated therewith. In a similar manner one of the links 103 can be suitably connected to the trailing edge flap 78, FIG. 6, so as to actuate this flap in unison with the flaps 74. It is obvious that by energizing the screw jack type of electric rotary actuator 108 the pilot can cause the flaps 74 and 78 to be deflected downward to the maximum extent such as disclosed in FIG. 6 or in the reverse sense to the intermediate position as shown in FIG. 11 or in the final closed position shown in FIG. 12. Electrical rotary actuators of the type disclosed in FIG. 13 can readily be arranged to form a servomotor system with either electrical or mechanical follow up so that when the actuator is energized in a given sense, it will rotate until the driven member, the flap, reaches a desired position when the circuit will be broken and the electric motor de-energized. The displaced member, the flap, can accordingly be caused to move in a direction and an amount proportional to the direction and magnitude of displacement of the control element actuated directly or remotely by the pilot. The specific details of such a servomechanism and control therefor form, per se, no part of the present invention. It will accordingly be apparent from the description of FIG. 12 that all of the pressure surface flaps 74 and trailing edge flap 78 may be suitably positioned in accordance with the desired flight condition under a suitable control, not shown, actuated by the pilot.

Figure 13:
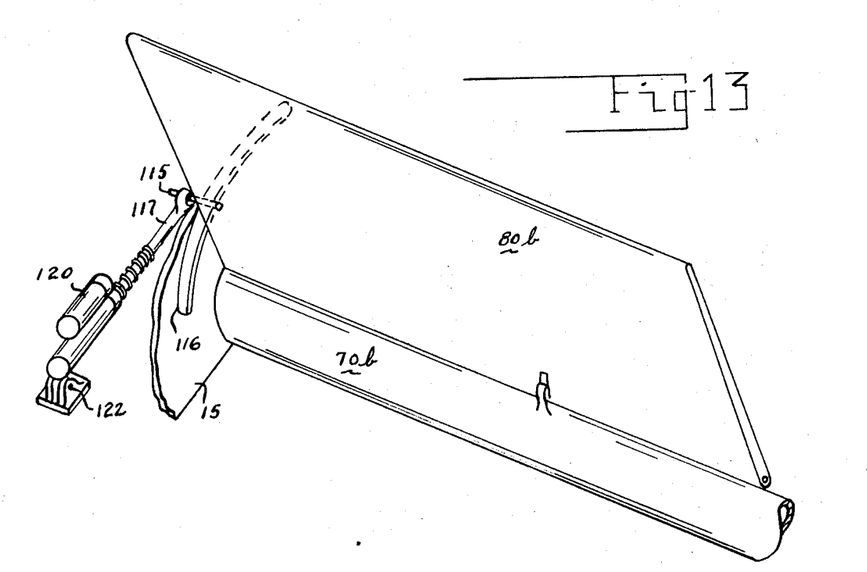
FIG. 13 is a view similar to FIG. 12 illustrating a typical actuating means for the suction surface flaps.

FIG. 13 illustrates a typical power actuated means for positioning a suction surface flap such as 80b, FIG. 6. It will be noted that the suction surface flaps 80b through 80e inclusive, have widtly varying angular settings both as to magnitude and direction and different rates of rotation are required in rapidly effecting a transition from the arrangement such as in FIG. 6 to that depicted in FIG. 11. In is accordingly necessary to provide a separate rotary actuator for each suction surface flap 80b through 80e respectively. As seen in FIG. 13, the suction surface flap 80b exteriorly hinged to the associated hollow spar member 70b has rigidly connected thereto a pin 115 which projects through an arcuate slot 116 in the inner wall of the end plate housing 15. This pin is connected within the end plate housing 15 to the terminal fitting of a jack screw 117 of a conventional electric screw jack type of rotary actuator 120 of the same type as the rotary actuator 108 of FIG. 12. The actuator is suitably pivotally mounted as at 122 so as to be free to swivel in the vertical plane. The actuator 120 may preferably form part of a servomotor combination with suitable follow up so that each flap may be positioned as dictated by the selected flight condition from a pilot actuated control. Each flap 80b through 80e will be provided with a jack screw type rotary actuator such as shown in FIG. 13 all operated independently of each other as the selected direction, rate and angular position. The rate of angular deflection for each flap 80b etc. in going from one flight condition to another can be selected by torque output desired of the electric motor or by separate control of the current supplied to the motor.

In order to insure smooth inlet flow in a chordwise direction no particular problem arises adjacent the wing roots because the curvature of the fuselage can be made such as to provide a comparatively smooth entry however to insure smooth flow into the wing ducts in the chordwise direction over the upper side of the wing end plates creates a problem. To smooth out the chordwise flow at the tip of each inboard wing panel 14, FIG. 1, over the end plate structure 15 a retractable guide structure is employed such as disclosed in FIGS. 14 and 15.

Figures 14, 15:
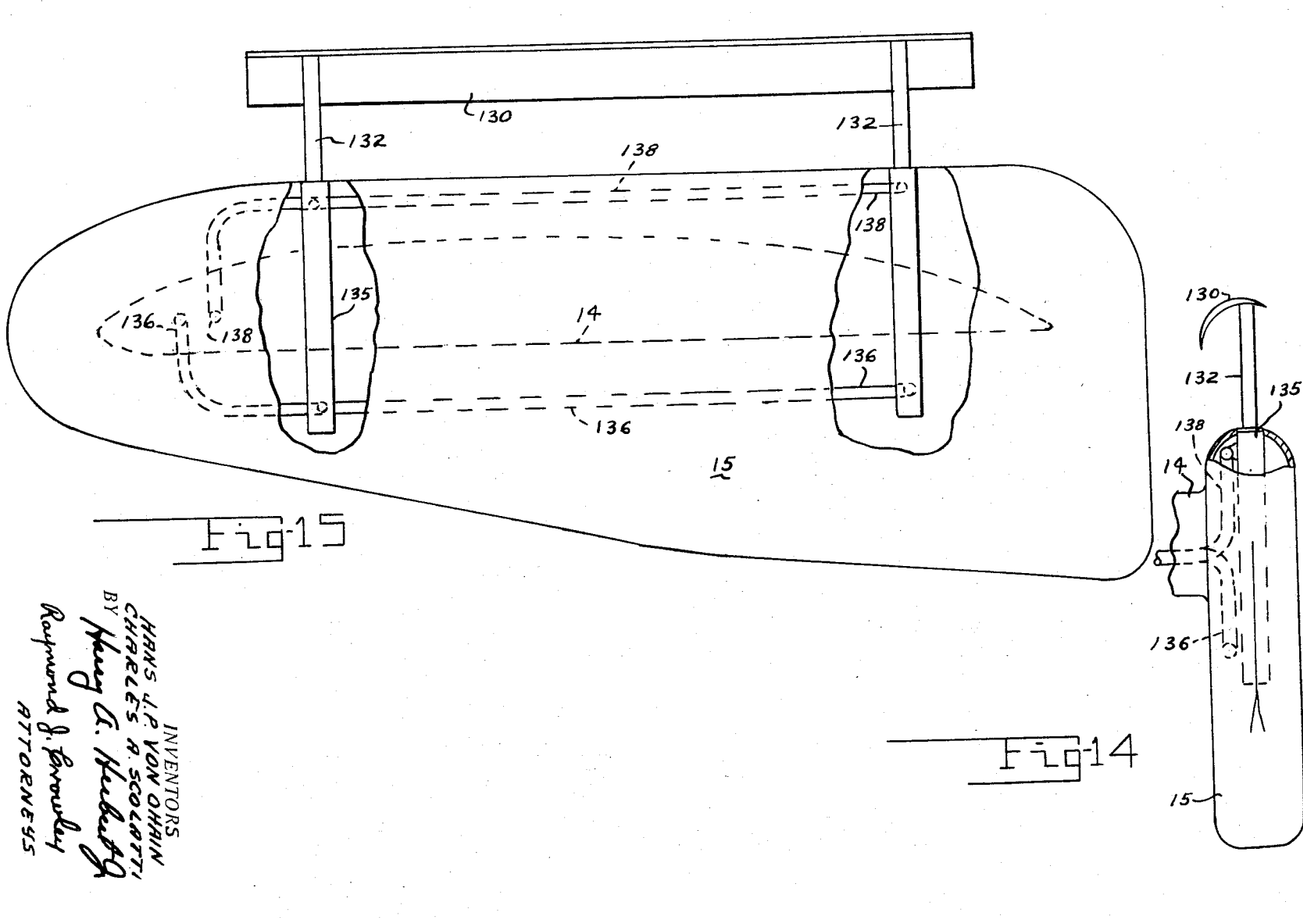
FIG. 14 is a front elevation view of a retractable means for guiding airflow over the wing end plates.
FIG. 15 is a side elevation partly broken away to further illustrate the guide means of FIG. 14 and the operating means therefor.

In these figures, a thin curved guide plate 130 is provided which normally conforms to and rests in contact with the curved upper surface of the end plate housing 15. The guide plate 130 is adapted to be rigidly secured at each end to a piston rod 132 forming part of a double acting hydraulic actuator cylinder 135. The actuator cylinders 135 are adapted to be connected in parallel by means of conduits 136 and 138 to a suitable source of hydraulic fluid under pressure on the aircraft under control of a selector valve, not shown, such that in all flight conditions except cruise and high speed flight conditions the hydraulic cylinders 135 will be energized to move the piston rods 132 upward to the limit of their stroke to elevate the guide plate 130 to the piston shown and serving to guide and direct inflow air over the top of the end plates 15 to smoothly flow into the thrust augmentor ducts.

It will be understood that the pilot will be provided with a single control organ such as a lever which when moved to predetermined positions corresponding to the desired flight condition will cause simultaneous energizing of the various servomechanisms to position the engine diverter valve 35, FIG. 3, the valves 45a through 45e, flaps 74, 78 and 80b through 80e and guide plate 130 in the position dictated by the desired flight condition.

We claim:
1. In an aircraft sustension system in which bypass air from a turbofan type of engine serves as a source of compressed air, a wing of airfoil cross section and having a hollow nose section and a plurality of hollow spar members spaced from the nose section and from each other in a chordwise direction, the number of spars being of the order of four or more, the space between the nose section and the first spar and between respective pairs of the spars constituting spanwise extending transverse flow ducts through the wing having respective inlets in the suction surface and respective outlets in the pressure surface of the wing, the suction surface of the wing including a plurality of spanwise extending flaps each pivotally supported at its trailing edge by a respective spar member and normally overlying and closing the inlet of a respective one of said flow ducts, the pressure surface of the wing including a plurality of spanwise extending flaps one hinged to the hollow nose section and the remaining flaps being pivotally supported by a respective spar member, all of said last-named flaps but one lying in the pressure surface of the wing respectively overlying and normally closing the outlet of a respective transverse flow duct, the last chordwise positioned flap on the pressure surface being a trailing edge flap, an operative flow connection between said compressed air source and the hollow nose section and hollow spars, a multiplicity of injection nozzles positioned in each of said transverse ducts and operatively connected to the hollow nose section or a respective hollow spar, said injection nozzles adapted to inject a multiplicity of high velocity jets of air into each transverse wing duct when the inlets and outlets thereto are opened by elevation of the suction surface flaps and depression of the pressure surface flaps, the high velocity jets inducing a flow of ambient air from over the suction surface of the wing into the respective ducts to mix therewith and the augmented mass flow being discharged downward between pairs of flaps on the pressure surface of the wing acting as diffusers to reduce the static pressure above the wing and increase the static pressure below the wing and thereby creating a lift reaction substantially independent of wing angle of attack, the flaps on said suction surface being independently angularly adjustable relative to each other so as to conform to the pattern of the inflow streamlines in the respective flight conditions, said wing being provided with chordwise extending end plates projecting above and below the suction and pressure surfaces of the wing respectively, a chordwise extending guide surface normally in contact with and overlying the top of each end plate and means to extend and retract each of said guide plates relative to its associated end plate, each said guide plate when elevated above the associated wing end plate serving to guide inflowing ambient air moving toward the suction surface of the wing from over the end plate when the aircraft is in the vertical takeoff flight condition.

* * * * *